Jan. 15, 1952 M. M. CANNON, JR 2,582,477
FOREHEARTH COOLED REFRACTORY CHANNEL JOINT
Filed April 19, 1950
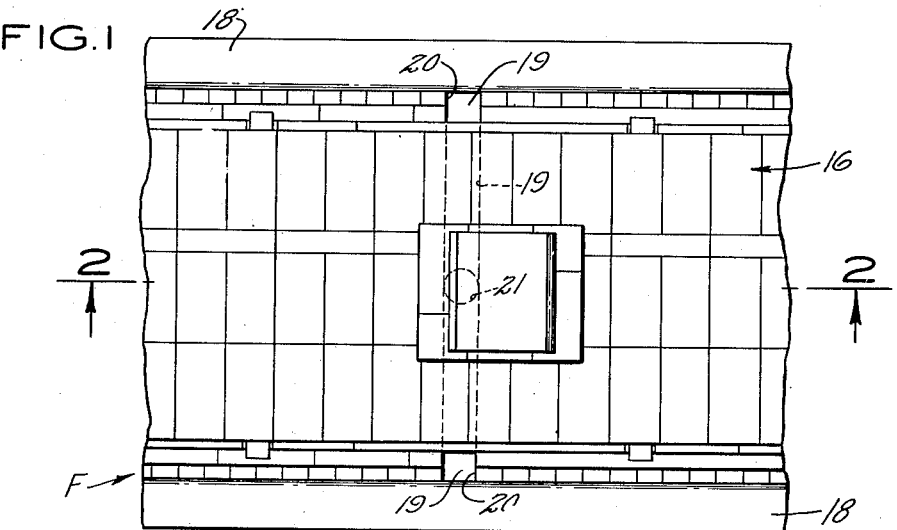
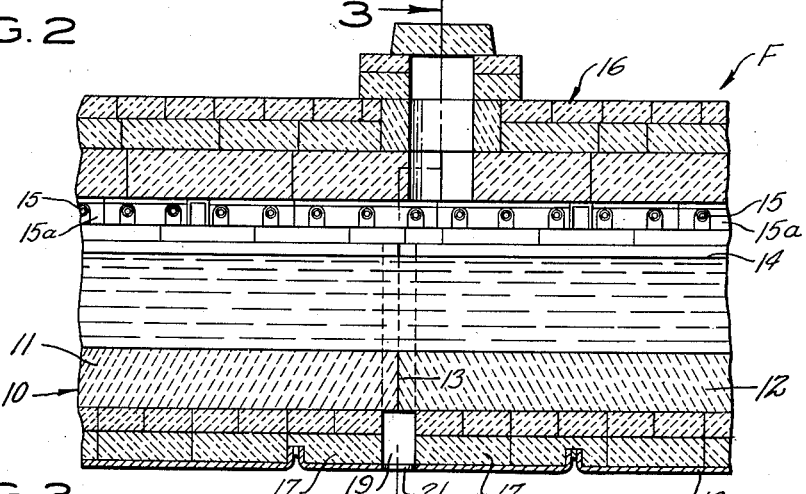
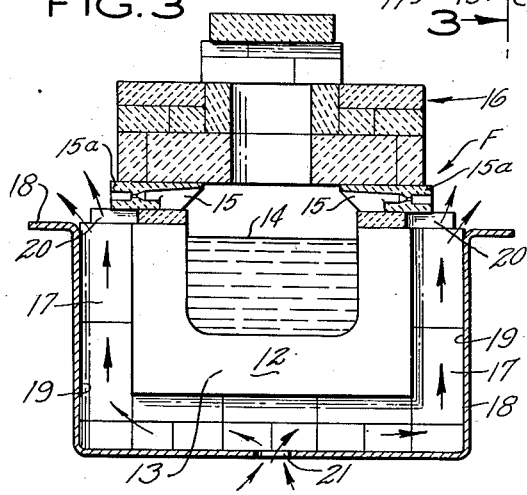
INVENTOR
MADISON M. CANNON JR
BY Parham + Bates
ATTORNEYS Patented Jan. 15, 1952

2,582,477

UNITED STATES PATENT OFFICE 2,582,477

FOREHEARTH COOLED REFRACTORY CHANNEL JOINT

Madison M. Cannon, Jr., West Hartford, Conn., assignor to Emhart Manufacturing Company, a corporation of Delaware Application April 19, 1950, Serial No. 156,915

2 Claims. (Cl. 49—54)

This invention relates generally to improvements in forehearths and more particularly to means for cooling the joints of the molten glass conducting refractory channels thereof.

A forehearth for molten glass customarily includes a refractory channel of generally U-shape in cross-section and of a predetermined length in which a stream of molten glass flows from a glass melting tank furnace to a delivery chamber at the outer end of the channel from which molten glass is fed in mold charges or otherwise removed. The bottom and side portions of the glass stream in the refractory channel tend to lose heat rapidly to and through the refractory channel and this tends to prevent desirable control and regulation of the temperature of the glass stream throughout its cross-section to bring the glass thereof to the desired temperature and condition of viscosity by the time it arrives at the place at which it is to be fed or otherwise removed. In order to minimize loss of heat from the glass stream through the refractory channel, it has been usual heretofore to insulate its glass contacting bottom and sides completely throughout their entire external surface areas. A forehearth refractory channel ordinarily consists of a plurality of sections arranged end to end with the adjacent ends of adjacent channel sections abutting each other.

A forehearth having such a channel insulated as above described has the shortcoming that molten glass from the stream will soon penetrate and seep through the joint between each two adjacent channel sections. The glass leaking through the joint will rapidly eat away the exposed refractory ends of adjacent channel sections, thus widening the gap at the joint and allowing increased leakage of glass into the insulation. Insulation is vulnerable to attack by the molten glass and soon will be penetrated and destroyed or impaired by the glass leaking through the joint to a substantial distance from the joint, the glass leakage accumulating between the channel and a metallic casing which customarily is provided to hold the insulation and the insulated refractory channel sections in place.

Leakage of glass as described tends to interfere with the provision and maintenance of desirable temperature and viscosity conditions of the glass in the channel during the time the forehearth is in use. It also may shorten the time that the forehearth may be kept in service before it must be dismantled and repaired or rebuilt.

An object of the present invention is to prevent the undesirable leakage of molten glass through the joints of a forehearth refractory channel while preserving the benefits of heat insulation of the channel.

A further object of the invention is to cool the joints of a forehearth refractory channel in a simple but effective way without any change in the overall design, construction or mode of operation of the forehearth and without requiring any expensive parts or adjuncts to apply the invention to the forehearth.

A more specific object of the invention is to cool the joints of a forehearth refractory channel externally by atmospheric air caused to move by natural draft or thermal influence against and along such joints.

I have discovered that I can cool the joints of an insulated forehearth refractory channel adequately by natural draft by providing an air channel at the outer edge of each such joint and extending a short distance laterally of each side thereof and supplying air from the ambient atmosphere to the bottom of this air channel through an intake opening provided in the forehearth casing while maintaining the upper ends of the side portions of the air channel also open to the atmosphere.

Other objects and advantages of the invention hereinafter will be pointed out or will become apparent from the following description of a practical embodiment of the invention as shown in the accompanying drawings, in which:

Figure 1 is a plan view of a fragmentary portion of a forehearth in which are included portions of adjacent sections having a joint therebetween;

Fig. 2 is a longitudinal vertical section along the line 2—2 of Fig. 1; and

Fig. 3 is a transverse vertical section along the line 3—3 of Fig. 2.

In the drawings, a forehearth, generally designated F, includes a refractory channel 10 comprising adjacent sections 11 and 12 arranged in end to end abutting relation so as to provide a transverse joint therebetween as indicated at 13, as best seen in Fig. 2. The refractory channel 10 is of U-shape in cross-section as shown for the section 12 in Fig. 3 and contains a stream of molten glass 14 which fills such channel nearly to its top.

The forehearth F is provided with heating means which may be represented by the burner ports 15, Fig. 2, in burner blocks 15a, Figs. 2 and 3, located in the side walls of the forehearth above the sides of the glass stream conducting refractory channel. A forehearth roof or cover structure, generally designated 16, surmounts the side walls of the forehearth. The particular construction of the forehearth roof or cover structure and of the elements of the side walls of the forehearth above the refractory glass containing channel 10 do not form part of the present invention and hence need not be further described.

The refractory channel 10 is supported and insulated by a layer 17 of a suitable heat insulation in a supporting metallic casing 18, the insulating layer 17 fitting closely against the bottom and sides of the refractory channel and spacing them from the corresponding portions of the external casing 18 which also is U-shaped in cross-section and suitably larger than the refractory channel to provide for an intervening insulating layer of the desired thickness. It will be understood that the metallic casing will in practice be supported by suitable supporting means (not shown) so as to mount the forehearth operatively in relation to a supply melting tank furnace (also not shown).

The forehearth parts and structural details pointed out so far are conventional and may vary considerably from those shown. The insulating layer 17 is shown as being formed of insulating brick but it may be partly or wholly formed of granular insulation, use of which is well known in the glass feeding art.

In applying the present invention to a forehearth having a transverse joint between refractory channel sections substantially as shown and described, a cooling air channel is provided at the outer edge of the joint so as to extend transversely of the channel completely across the bottom thereof and at each of the opposite sides of the channel to the top thereof. Such an air channel is indicated at 19 and may be formed by interrupting or omitting insulation of the layer 17 around the outer edge of the joint 13 and to a short distance as from one to two inches, laterally of such edge at each of opposite sides thereof. The air channel 19 thus has as its inner side the outer edge of the joint 13 and narrow portions of the outer surfaces of the sections of the refractory channel at opposite sides of that joint. The opposite, outer wall of the air channel is the portion of the metallic casing 18 which is exposed by the omission of insulation between the joint 13 and the casing while the lateral walls of the air channel are the opposed end surfaces of adjacent portions of the insulating layer 17. The vertical side portions of the air channel 19 are provided at their upper ends with ports indicated at 20, open to the atmosphere. An intake port for supplying air from the atmosphere to the bottom portion of the air channel is provided by cutting or punching a hole at 21 in the metallic casing 18 directly beneath such air channel and preferably at the middle of its bottom portion. The intake port 21 may be of any suitable diameter or dimensions, as in the order of three to four inches in diameter.

The operation of the improved means just described to cool the joint 13 of the refractory channel will be readily understood. Air from the atmosphere passes by natural draft through the intake port 21 to the bottom portion of the air channel 19 where it will divide into currents respectively passing to the side portions of the air channel and thence upward in such portions to and through the outlet ports 20 at the top thereof, substantially as indicated by the directional arrows in Fig. 3. This air will scrub over the outer edge of the joint 13 and the immediately adjacent exposed portions of the outer surfaces of the refractory channel sections so as to provide sufficient cooling action thereon to solidify or "freeze" any glass which has entered the joint at the inner edge thereof before such glass seeps through the joint. Consequently, the refractory channel will be maintained substantially glass tight at the joint between channel sections. Difficulties resulting from glass leakage through such joints and into the insulation of completely insulated refractory channels customarily provided prior to the invention are obviated. This important result is accomplished without any extra maintenance expense and, as a practical matter, without additional cost when a forehearth provided with channel joint cooling means of the invention is constructed. It will be understood that all refractory channel joints of a complete forehearth will be provided with individual cooling means substantially as shown and as herein described. A substantial saving will be effected by the prolongation of the useful life of the forehearth and by the aid the invention gives during such life to the maintenance of desirable glass temperature, viscosity and other conditions in the forehearth.

The illustrative embodiment of the invention shown in the accompanying drawings and herein particularly described may be changed and modified in various ways which will now be obvious to those skilled in the art and the invention, therefore, is not to be limited to the details of this illustrative embodiment.

I claim:

1. In combination, a generally U-shaped refractory molten glass conducting channel comprising a plurality of sections arranged end to end in abutting relation so as to provide a transverse joint extending between the bottom and side portions of adjacent sections, a generally U-shaped outer metallic casing in which said refractory channel is disposed with its bottom and sides spaced from the corresponding portions of the casing, and heat insulation disposed between the bottom and sides of the refractory channel sections and the corresponding portions of the outer metallic casing and cooperating therewith to define an air channel having a bottom portion and upwardly extending side portions extending across the bottom and up the sides of the refractory channel, respectively, at the joint between adjacent sections thereof, said air channel having an inner wall consisting of the outer edge of said joint and only narrow marginal portions of the bare outer surface of the adjacent end portions of the refractory channel sections at opposite sides of said joint, an outer wall opposite the inner wall and consisting of a portion of the outer metallic casing and a pair of side walls consisting of opposed end surfaces of spaced adjacent portions of the heat insulation, said air channel having an intake port at its bottom open to the ambient atmosphere and outlet ports at the upper ends of its upwardly extending side portions also open to the ambient atmosphere.

2. The combination defined by claim 1 wherein said intake port is a hole in the bottom of said outer metallic casing at about the middle of the bottom portion of the air channel and the outlet ports are open upper ends of the upwardly extending side portions of the air channel.

MADISON M. CANNON, Jr.

REFERENCES CITED

The following references are of record in the file of this patent:

UNITED STATES PATENTS

| Number | Name | Date |
|---|---|---|
| 261,054 | Siemens | July 11, 1882 |
| 1,512,566 | Tucker et al. | Oct. 21, 1924 |
| 2,162,983 | Sullivan | June 20, 1939 |
| 2,174,458 | Blau et al. | Sept. 26, 1939 |